United States Patent
Raz et al.

(10) Patent No.: US 11,525,732 B2
(45) Date of Patent: Dec. 13, 2022

(54) GENERATING NARROW-BAND SPECTRAL IMAGES FROM BROAD-BAND SPECTRAL IMAGES

(71) Applicant: Unispectral Ltd., Ramat Gan (IL)

(72) Inventors: Ariel Raz, Kfar Vradim (IL); Shahar Katz, Tel Aviv (IL); Hila Gabay, Givatayim (IL); Efrat Immer, Tel Aviv (IL); Eliahu Chaim Ashkenazi, Jerusalem (IL)

(73) Assignee: UNISPECTRAL LTD., Ramat Gan (IL)

( * ) Notice: Subject to any disclaimer, the term of this patent is extended or adjusted under 35 U.S.C. 154(b) by 40 days.

(21) Appl. No.: 16/982,318

(22) PCT Filed: Mar. 18, 2019

(86) PCT No.: PCT/IB2019/052155
§ 371 (c)(1),
(2) Date: Sep. 18, 2020

(87) PCT Pub. No.: WO2019/180571
PCT Pub. Date: Sep. 26, 2019

(65) Prior Publication Data
US 2021/0010862 A1    Jan. 14, 2021

Related U.S. Application Data

(60) Provisional application No. 62/644,538, filed on Mar. 18, 2018.

(51) Int. Cl.
*G01J 3/26* (2006.01)
*H04N 9/04* (2006.01)
(Continued)

(52) U.S. Cl.
CPC ............ *G01J 3/26* (2013.01); *G01J 3/2803* (2013.01); *G01J 3/2823* (2013.01);
(Continued)

(58) Field of Classification Search
CPC ........................................................ G04J 3/26
(Continued)

(56) References Cited

U.S. PATENT DOCUMENTS

| 5,159,199 A | 10/1992 | LaBaw |
| 2011/0228832 A1* | 9/2011 | De Francisco Martin ................ H04W 72/02 375/224 |

(Continued)

FOREIGN PATENT DOCUMENTS

| CN | 101124462 A | 2/2008 |
| CN | 106768338 A | 5/2017 |

(Continued)

OTHER PUBLICATIONS

Murakami, Yuri, Masahiro Yamaguchi, and Nagaaki Ohyama. "Hybrid-resolution multispectral imaging using color filter array." Optics express 20.7 (2012): 7173-7183.
(Continued)

*Primary Examiner* — Yulin Sun
(74) *Attorney, Agent, or Firm* — Kenealy Vaidya LLP

(57) ABSTRACT

System and method for narrowing the transmission curves obtained using a spectral imager in which spectral images are acquired using a MEMS Fabri-Perot (FP) tunable filter. A method includes acquiring a first plurality of broad-band spectral images associated with respective MEMS FP etalon states and processing the first plurality of broad-band spectral images into a second plurality of narrow-band spectral images.

32 Claims, 14 Drawing Sheets

(51) Int. Cl.
*G01J 3/28* (2006.01)
*H04N 5/232* (2006.01)
(52) U.S. Cl.
CPC ..... *H04N 5/23229* (2013.01); *H04N 9/04515* (2018.08); *H04N 9/04553* (2018.08); *H04N 9/04555* (2018.08); *H04N 9/04557* (2018.08); *H04N 9/04559* (2018.08); *G01J 2003/2806* (2013.01); *G01J 2003/2826* (2013.01)
(58) Field of Classification Search
USPC ........................................................ 348/164
See application file for complete search history.

(56) References Cited

U.S. PATENT DOCUMENTS

| | | | |
|---|---|---|---|
| 2016/0097678 A1* | 4/2016 | Arieli | G01J 3/12 356/453 |
| 2016/0327682 A1 | 11/2016 | Zhang et al. | |
| 2017/0118453 A1* | 4/2017 | Kim | H04N 9/04557 |
| 2017/0126990 A1* | 5/2017 | Han | G01J 3/2803 |
| 2018/0080825 A1* | 3/2018 | Learmonth | G01J 3/0297 |

FOREIGN PATENT DOCUMENTS

| | | |
|---|---|---|
| WO | WO2006046898 A1 | 5/2006 |
| WO | 2017/017684 A1 | 2/2017 |

OTHER PUBLICATIONS

Yang et al., "Multi-spectial demosaicking method based on compressive sensing", Chinese Journal of Liquid Crystals and Displays, vol. 32, No. 1, Jan. 2017, pp. 56-61 (with English abstract).

Heikkinen et al. "Evaluation and unification of some methods for estimating reflectance spectra from RGB images," J. Opt. Soc. Am. A/vol. 25, No. 10/Oct. 2008, pp. 2444-2458.

* cited by examiner

Acquiring, by a spectral imager that comprises a tunable filter, a first plurality (N) of broad-band spectral images associated with respective states of the tunable filter. N is an integer that exceeds one. The tunable filter may be a Fabri-Perot tunable filter such as a MEMS Fabri-Perot etalon. The respective states of the tunable filter may include N different states. The respective states differ from each other by their transfer function. 610

Processing, by a hardware processor, the first plurality of broad-band spectral images into a second plurality (M) of narrow-band spectral images. M is an integer that exceeds one. 620

Applying an expansion process for generating, from the first plurality of broad-band spectral images, a fourth plurality (Q) of broad-band spectral images. 622

Processing the fourth plurality of broad-band spectral images into the second plurality of the narrow-band spectral images. 624

Fig. 6

Acquiring, by a spectral imager that comprises a tunable filter, a first plurality (N) of broad-band spectral images associated with respective states of the tunable filter. N is an integer that exceeds one. The tunable filter may be a Fabri-Perot tunable filter such as a MEMS Fabri-Perot etalon. The respective states of the tunable filter may include N different states. The respective states differ from each other by their transfer function. 610

Processing, by a hardware processor, the first plurality of broad-band spectral images into a second plurality (M) of narrow-band spectral images. M is an integer that exceeds one. 621

Constructing the second plurality of narrow-band spectral images by linearly transforming the first plurality of broad-band spectral images using a reconstruction matrix. 626

Fig. 7

GENERATING NARROW-BAND SPECTRAL IMAGES FROM BROAD-BAND SPECTRAL IMAGES

CROSS REFERENCE

This application claims priority from U.S. provisional patent 62/644,538 filing date Mar. 18, 2018 which is incorporated herein by its entirety.

BACKGROUND

Small tunable filters include microelectromechanical system (MEMS) filters such as the MEMS Fabri-Perot filter (hereinafter—FP etalon).

There is a growing need to provide narrow band images from a spectral imager that includes a FP etalon.

SUMMARY

There may be provided methods, spectral imagers and computer program products for generating narrow-band spectral images from broad-band spectral images. The generating of narrow-band spectral images from the broad-band spectral images may include constructing the narrow-band spectral images by a set of linear transformations applied on the broad-band spectral images through the use of a reconstruction matrix.

There may be provided a method for generating narrow-band spectral images, the method may include acquiring, by a spectral imager that may include a tunable filter, a first plurality (N) of broad-band spectral images associated with respective states of the tunable filter; and processing, by a processing circuitry the first plurality of broad-band spectral images into a second plurality (M) of narrow-band spectral images.

The reconstruction matrix when multiplied by H, which is a matrix that represents spectral responses associated with respective states of the tunable filter, can result in a sparse matrix which ideally resembles the unity matrix associated with an ideal narrow-band (e.g. hyperspectral) filter.

The each broad-band image of the first plurality of broad-band spectral images may be associated with a respective broad-band transmission curve having a respective broad-band full width half maximum value; and wherein each narrow-band spectral image of the second plurality of narrow-band spectral images may be associated with a respective narrow-band transmission curve having a narrow-band full width half maximum smaller than the broad-band full width half maximum value of the broad-band transmission curve.

The spectral imager may include an image sensor having a filter array with a third plurality (C) of filter types, wherein filters of different types differ from each other by transfer function; and wherein C exceeds two.

C may equal three and the filter array may be a color filter array.

C may equal three and the filter array may be a red, green and blue color filter array.

C may equal four and the filter array may be a red, green, blue and infrared filter array.

C may equal four and the filter array may be a red, green, blue and white filter array.

C may equal three and the filter array may be a red, blue and white filter array The method may include applying an expansion process for generating, from the first plurality of broad-band spectral images, a fourth plurality (Q) of broad-band spectral images and processing the fourth plurality of broad-band spectral images into the second plurality of the narrow-band spectral images; and wherein Q exceeds each one of N and M.

The ratio between Q and N may be an integer.

The expansion process may be a demosaicing process.

The expansion process differs from a demosaicing process.

The processing of the fourth plurality of broad-band spectral images into the second plurality of narrow-band spectral images may include constructing the second plurality of narrow-band spectral images by linearly transforming the fourth plurality of broad-band spectral images using a reconstruction matrix.

The method may include constructing the second plurality of narrow-band spectral images by using a reconstruction matrix; wherein the reconstruction matrix represents a cost function and spectral responses associated with respective states of the tunable filter.

The reconstruction matrix may be calculated based on a Tikhonov matrix.

The Tikhonov matrix may be a multiple of the identity matrix.

The Tikhonov matrix may be a lowpass operator.

The Tikhonov matrix may be selected out of a group of Tikhonov matrices.

The group of Tikhonov matrices may be associated with a group of reconstruction matrices; wherein different reconstructions matrices of the group may be associated with different values of one or more spectral imager performance attributes.

The one or more spectral imager performance attributes may include a signal to noise ratio.

The one or more spectral imager performance attributes may include a resolution.

The reconstruction matrix may equal $(H^T H + \Gamma^T \Gamma)^{-1} H^T$, wherein H may be a matrix that represents spectral responses associated with respective states of the tunable filter, and $\Gamma$ a Tikhonov matrix.

Alternatively, the reconstruction matrix may include $O^T H [(H^T H + \Gamma^T \Gamma)^{-1}]^T$ wherein O may be a general matrix.

The method may include selecting the Tikhonov matrix out of a group of Tikhonov matrices.

The selecting may be based on at least one property of at least one of the first plurality of broad-band spectral images.

The at least one property may be a signal to noise ratio.

The at least one property may be a resolution.

The method may include calculating the reconstruction matrix.

The cost function may be a Tikhonov matrix.

The Tikhonov matrix may be a multiple of the identity matrix.

The Tikhonov matrix may be a lowpass operator.

The method may include selecting the Tikhonov matrix out of a group of Tikhonov matrices.

The group of Tikhonov matrices may be associated with a group of reconstruction matrices; wherein different reconstructions matrices of the group may be associated with different values of one or more spectral imager performance attributes.

The one or more spectral imager performance attributes may include a signal to noise ratio.

The one or more spectral imager performance attributes may include a resolution.

The reconstruction matrix may equal $(H^T H + \Gamma^T \Gamma)^{-1} H^T$, wherein H may be a matrix that represents spectral responses associated with respective states of the tunable filter, and $\Gamma$ a Tikhonov matrix.

Alternatively, the reconstruction matrix may include $O^TH [(H^TH+\Gamma^T\Gamma)^{-1}]^T$, wherein O may be a general matrix.

The image sensor may be a monochromatic image sensor.

The tunable filter may be a Fabri Perot etalon.

The tunable filter may be a single Fabri Perot etalon that operates, when acquiring the first plurality of broad-band spectral images in a wavelength range of 400-1000 nanometers.

The method further may include displaying one or more of the M narrow-band spectral images.

There may be provided a spectral imager that may include a tunable filter and a sensor; wherein the sensor may be configured to acquire a first plurality (N) of broad-band spectral images associated with respective states of the tunable filter; and a processing circuitry that may be configured to process the first plurality of broad-band spectral images into a second plurality (M) of narrow-band spectral images.

Each broad-band image of the first plurality of broad-band spectral images may be associated with a respective broadband transmission curve having a respective broad-band full width half maximum value; and wherein each narrow-band spectral image of the second plurality of narrow-band spectral images may be associated with a respective narrow-band transmission curve having a narrow-band full width half maximum smaller than the broad-band full width half maximum value of the broad-band transmission curve.

The spectral imager may include an image sensor having a filter array with a third plurality (C) of filter types, wherein filters of different types differ from each other by transfer function; and wherein C exceeds two.

C may equal three and the filter array may be a color filter array.

C may equal three and the filter array may be a red, green and blue color filter array.

C may equal four and the filter array may be a red, green, blue and infrared filter array.

C may equal four and the filter array may be a red, green, blue and white filter array.

C may equal three and the filter array may be a red, blue and white filter array The processing circuitry may be configured to apply an expansion process for generating, from the first plurality of broad-band spectral images, a fourth plurality (Q) of broad-band spectral images and process the fourth plurality of broad-band spectral images into the second plurality of the narrow-band spectral images; and wherein Q exceeds each one of N and M.

The ratio between Q and N may be an integer.

The expansion process may be a demosaicing process.

The expansion process differs from a demosaicing process.

The processing circuitry may be configured to construct the second plurality of narrow-band spectral images by linearly transforming the fourth plurality of broad-band spectral images using a reconstruction matrix.

The processing circuitry may be configured to construct the second plurality of narrow-band spectral images by using a reconstruction matrix; wherein the reconstruction matrix represents a cost function and spectral responses associated with respective states of the tunable filter.

The reconstruction matrix may be calculated based on a Tikhonov matrix.

The Tikhonov matrix may be a multiple of the identity matrix.

The Tikhonov matrix may be a lowpass operator.

The Tikhonov matrix may be selected out of a group of Tikhonov matrices.

The group of Tikhonov matrices may be associated with a group of reconstruction matrices; wherein different reconstructions matrices of the group may be associated with different values of one or more spectral imager performance attributes.

The one or more spectral imager performance attributes may include a signal to noise ratio.

The one or more spectral imager performance attributes may include a resolution.

The reconstruction matrix may equal $(H^TH+\Gamma^T\Gamma)^{-1}H^T$, wherein H may be a matrix that represents spectral responses associated with respective states of the tunable filter, and $\Gamma$ a Tikhonov matrix.

Alternatively, the reconstruction matrix may include $O^TH [(H^TH+\Gamma^T\Gamma)^{-1}]^T$, wherein O may be a general matrix.

The Processing circuitry may be configured to perform a selection of the Tikhonov matrix out of a group of Tikhonov matrices.

The selection may be responsive to at least one property of at least one of the first plurality of broad-band spectral images.

The at least one property may be a signal to noise ratio.

The at least one property may be a resolution.

The processing circuitry may be configured to calculate the reconstruction matrix.

The cost function may be a Tikhonov matrix.

The Tikhonov matrix may be a multiple of the identity matrix.

The Tikhonov matrix may be a lowpass operator.

The processing circuitry may be configured to select the Tikhonov matrix out of a group of Tikhonov matrices.

The group of Tikhonov matrices may be associated with a group of reconstruction matrices; wherein different reconstructions matrices of the group may be associated with different values of one or more spectral imager performance attributes.

The one or more spectral imager performance attributes may include a signal to noise ratio.

The one or more spectral imager performance attributes may include a resolution.

The reconstruction matrix may equal $(H^TH+\Gamma^T\Gamma)^{-1}H^T$, wherein H may be a matrix that represents spectral responses associated with respective states of the tunable filter, and $\Gamma$ a Tikhonov matrix.

Alternatively, the reconstruction matrix may include $O^TH [(H^TH+\Gamma^T\Gamma)^{-1}]^T$ wherein O may be a general matrix.

The image sensor may be a monochromatic image sensor.

The tunable filter may be a Fabri Perot etalon.

The tunable filter may be a single Fabri Perot etalon that operates, when acquiring the first plurality of broad-band spectral images in a wavelength range of 400-1000 nanometers.

There may be provided a method for generating narrow-band spectral images, the method may include: acquiring, by a spectral imager that may include a tunable light source, a first plurality (N) of broad-band spectral images associated with respective states of the tunable light source; and processing, by a processing circuitry the first plurality of broad-band spectral images into a second plurality (M) of narrow-band spectral images.

There may be provided a method for generating narrow-band spectral images, the method may include: receiving by a processing circuitry, a first plurality (N) of broad-band spectral images; wherein the N broad-band spectral images were acquired by a spectral imager that may include a tunable filter; wherein the N broad-band spectral images may be associated with respective states of the tunable filter; and processing, by the processing circuitry, the first plurality of broad-band spectral images into a second plurality (M) of narrow-band spectral images.

There may be provided a method for generating narrow-band spectral images, the method may include: receiving by a processing circuitry, a first plurality (N) of broad-band spectral images; wherein the N broad-band spectral images were acquired by a spectral imager that may include a tunable filter; wherein the N broad-band spectral images may be associated with respective states of the tunable filter; and processing, by the processing circuitry, the first plurality of broad-band spectral images into a second plurality (M) of narrow-band spectral images.

There may be provided a non-transitory computer readable medium that stores instructions that once executed by a processing circuitry causes the processing circuitry to receive a first plurality (N) of broad-band spectral images; wherein the N broad-band spectral images were acquired by a spectral imager that may include a tunable filter; wherein the N broad-band spectral images may be associated with respective states of the tunable filter; and process the first plurality of broad-band spectral images into a second plurality (M) of narrow-band spectral images.

There may be provided a non-transitory computer readable medium that stores instructions that once executed by a device that may include a spectral imager and a processing circuitry causes the device to acquire, by a spectral imager that may include a tunable filter, a first plurality (N) of broad-band spectral images associated with respective states of the tunable filter; and process, by the processing circuitry the first plurality of broad-band spectral images into a second plurality (M) of narrow-band spectral images.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals.

FIG. 6 illustrates an example of a method;

FIG. 7 illustrates an example of a method;

DETAILED DESCRIPTION

Figure 1:
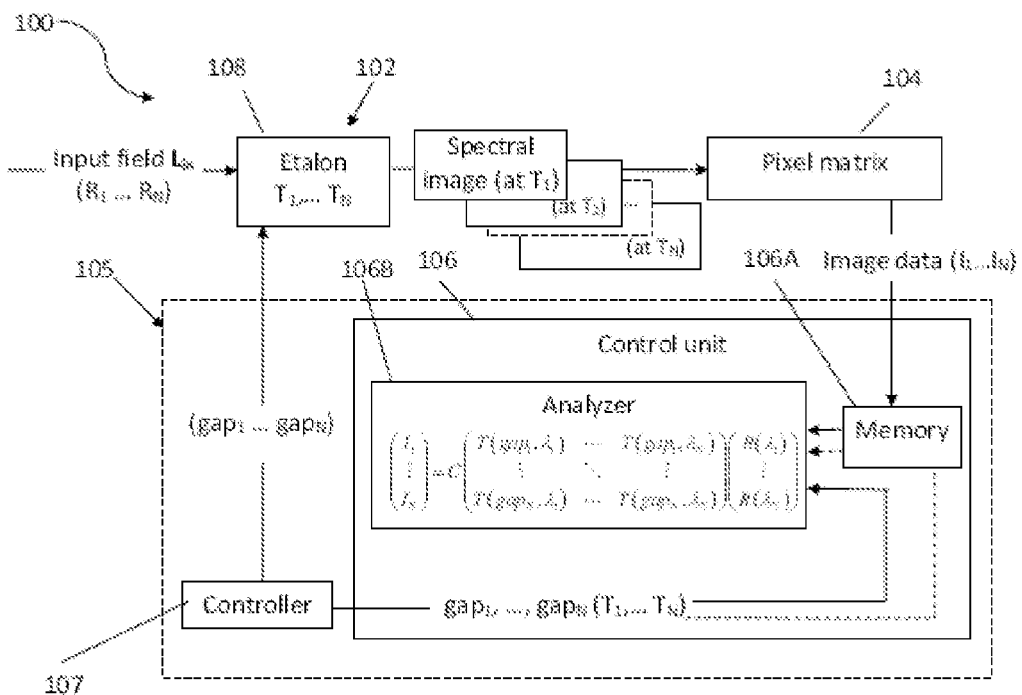
FIG. 1 illustrates schematically a known spectral imaging system based on operation of a FP etalon.

Any reference to a spectral imager should be applied, mutatis mutandis to a method that is executed by a spectral imager and/or to a computer program product that stores instructions that once executed by the spectral imager will cause the spectral imager to execute the method.

Any reference to method should be applied, mutatis mutandis to a spectral imager that is configured to execute the method and/or to a computer program product that stores instructions that once executed by the spectral imager will cause the spectral imager to execute the method.

Any reference to a computer program product should be applied, mutatis mutandis to a method that is executed by a spectral imager and/or a spectral imager that is configured to execute the instructions stored in the non-transitory computer readable medium.

The term "and/or" is additionally or alternatively.

A narrow-band FP etalon can be designed (a) either using metallic single layer coatings, or (b) using multilayer dielectric coatings.

On one hand, since metallic coatings have a very high absorption, the transmission of a FP etalon having such filter coatings is practically too low (~5%). On the other hand, in order to get sufficiently narrow transmission bands with a multi-layer dielectric coatings design, the number of coating layers needs to be high (~22 layers), leading to a thick coating stack that causes very high residual stress on MEMS substrates and deforms them mechanically.

Thus, due to the constrains on the total permissible stress in the coatings, the number of such coating layers on a FP etalon has to be significantly reduced, inevitably causing the transmission bands to become much wider in comparison to those achievable when using the significantly thicker substrates commonly used in non-MEMS Fabri-Perot filters.

To qualify as "hyperspectral", a tunable filter needs to provide very narrow-band transmission curves (e.g. with a full width half maximum (FWHM) of 1-10 nm). In practice, very narrow-band FP etalon filters (and in particular MEMS based filters) are limited to work either (approximately) in the 400-600 nm wavelength range or (approximately) in the 600-900 nm wavelength range, since their transmission curves cannot be made narrow over a wide wavelength range such as the 400-1000 nm range without introducing higher order "blobs" in the transmission curves.

There is therefore a need for, and it would be desirable to have a MEMS FP etalon-based spectral imagers that provide narrow-band filters/transmission curves over a wide (e.g. 400-1000 nm) wavelength range.

In the following detailed description, the term "broad-band spectra" refers to spectra resembling that (for example—equal) of a spectrum of a single band pass filter with a FWHM equal to or greater than a predefined value—such as but not limited to 50 nm, or that of a multi-band pass filter) and the term "narrow-band spectra" refers to spectra resembling (for example—equals) that of a single band pass filter with a FWHM smaller than the predefined value—such as but not limited to 50 nm). When used, the term "narrower-band spectra" refers to spectra that is narrower than broad band spectra by a FWHM in the range of 0-1 nm, 1-10 nm, 10-50 nm, 50-100 nm and even more than 100 nm.

Narrow-band transmission curves and even hyperspectral transmission curves may be obtained in an extended wavelength range (e.g. 400-1000 nm) using a spectral imager such as the spectral imager of FIG. 1 and by converting broad-band spectral images to narrow-band spectral images.

Broad-band spectral images can be obtained using a FP etalon that provides only broad-band transmission spectra (for example, spectra with FWHM greater than about 75-100 nm). These broad-band spectral images can be converted using methods and processes disclosed herein into narrow-band spectral images and even hyperspectral spectral images. The suggested methods, spectral imagers and computer program products provide a cheap, highly effective (low absorbance) and high resolution spectral imager.

A FP etalon can be designed such that each of its states produces a transmission curve with a form that resembles that of a multi-band transmission filter which partially overlaps the transmission curves of the filter's neighboring states. Each state of the FP etalon provides a broad-band spectrum with a given shape, from which one can obtain a "broad-band spectral image" that includes a number of mixed wavelengths. It is disclosed herein that the broad-band spectral image can then be transformed into one or more narrower-band spectral (and even hyperspectral) images. The transformation may include reconstruction of an imaged object's radiosity (also referred to as "flux density" and "irradiance" and expressed in Watts/m2) as if obtained with a series of narrow-band filters, by manipulating the image data obtained through the multi-band transmission curves.

In an example there is provided a method, that may include providing a spectral imager that includes a FP etalon, acquiring a first plurality (N) of broad-band spectral images associated with respective FP etalon states, a processing of the first plurality of broad-band spectral images into a second plurality (M) of narrow-band spectral images. N and M are positive integers.

In an example, each broad-band image of the first plurality is associated with a respective broad-band transmission curve having a respective broad-band full width half maximum value $FWHM_{BB}$ and each narrow-band spectral image of the second plurality is associated with a respective narrow-band transmission curve having a narrow-band full width half maximum $FWHM_{NB}$ smaller than $FWHM_{BB}$.

In an example, the spectral imager includes a color image sensor having a color filter array (CFA) with a third plurality (C) of filter types.

In an example, C=3, the first plurality includes N broad-band spectral images $Í_{1...N}$, and the method may include applying an expansion process (such as but not limited to demosaicing) to the $Í_{1...N}$ images to obtain A fourth plurality (Q) of broad-band spectral images (for example 3N broad-band spectral images) $I_{1...3N}$ and processing the $I_{1...3N}$ broad-band spectral images into the second plurality (M) M≤3N narrow-band spectral images $\tilde{R}_{1...M}$.

In an example, C=4, the first plurality includes N broad-band spectral images $Í_{1...N}$, and the method further comprises applying demosaicing to the $Í_{1...N}$ images to obtain 4N broad-band spectral images $I_{1...4N}$ and processing the $I_{1...4N}$ broad-band spectral images into M≤4N narrow-band spectral images $\tilde{R}_{1...M}$.

Yet in another example, the spectral imager includes a monochromatic image sensor without a CFA, the first plurality of broad-band spectral images includes N broad-band spectral images $Í_{1...N}$, and the method further comprises processing the $Í_{1...N}$ broad-band spectral images into a M≤N narrow-band spectral images $\tilde{R}_{1...M}$.

FIG. 1 illustrates an example of a spectral imager that is based on the operation of a tunable filter such as the FP etalon.

FIG. 1 illustrates a spectral imager 100 that includes an optical unit 102 and image sensor 104 and a control system 105.

Control system 105 includes a control unit 106 configured for data communication with a readout circuit of image sensor 104 for receiving image data therefrom and processing the received data.

Optical 102 includes a tunable filter such as a tunable dispersive unit/element that functions as a wide spectral filter 108.

In an example, the tunable dispersive unit/element is a FP etalon with a wide transmission peak. Control unit 106 includes data input and output utilities (not shown), a memory module 106A and an analyzer module 106B adapted for analyzing the image data from the pixel matrix unit 104.

Control system 105 further includes a controller 107, which is configured to control the tuning of FP etalon 108 and to provide data about the variation of a tunable parameter. The controller may be part of control unit 106, a separate module, or part of etalon 108.

The tuning of the FP etalon is aimed at controllably varying its spectral transmission profile (transmission function), i.e. at changing the dispersive pattern of light passing therethrough. In case of a FP etalon, the tunable parameter of FP etalon 108 is a gap between its reflective surfaces. Different gaps correspond to different states.

Controller 107 operates the tuning procedure and provides data about the different values of the tunable parameter, e.g. gapi, . . . gapN, or provides data about the corresponding transmission functions of the etalon, Ti, . . . $T_N$. FP etalon 108 is exemplarily located along a common optical axis in front of an imaging lens module, while image sensor 104 is located at an imaging plane that coincides with a back focal plane.

A spectral imaging system such as system 100 can provide N different broad-band images which are taken at different FP etalon states (operation modes).

System 100 can include or be otherwise operatively connected to a processing device (including for example a hardware processor such as a CPU, an FPGA, an ASIC, an image processor, and the like) configured to execute the operations related to generating narrow band images from broad band images as disclosed herein. According to one example, the processing device is part of control unit 106. According to another example, the processing device is part of etalon 108. According to yet another example, the processing unit is part of some other computerized device externally connected to system 100

Figure 2A:
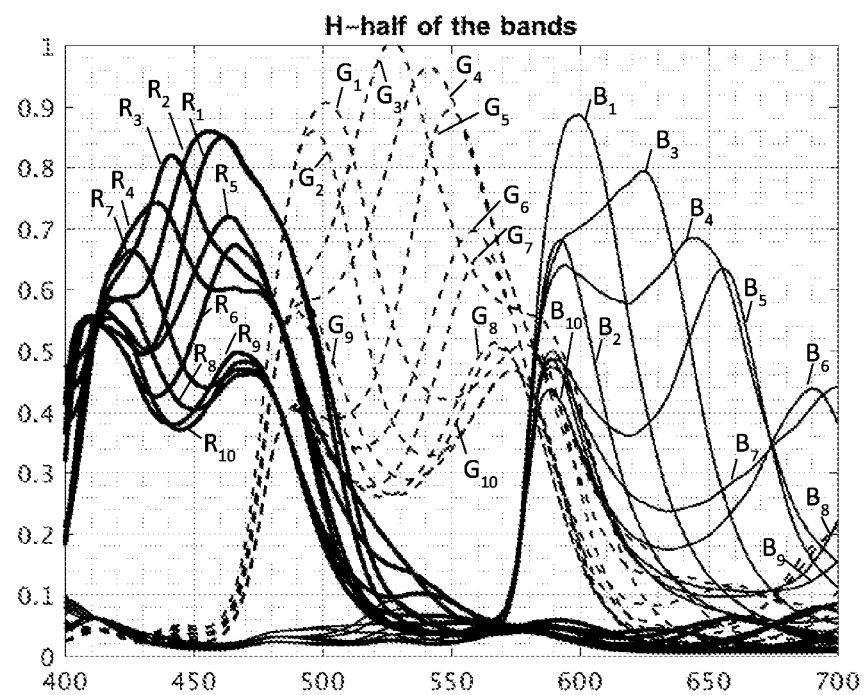
FIG. 2A shows one half of a broad-band system response obtained at different states of operation of a FP etalon based spectral imaging system disclosed herein.
Figure 2B:
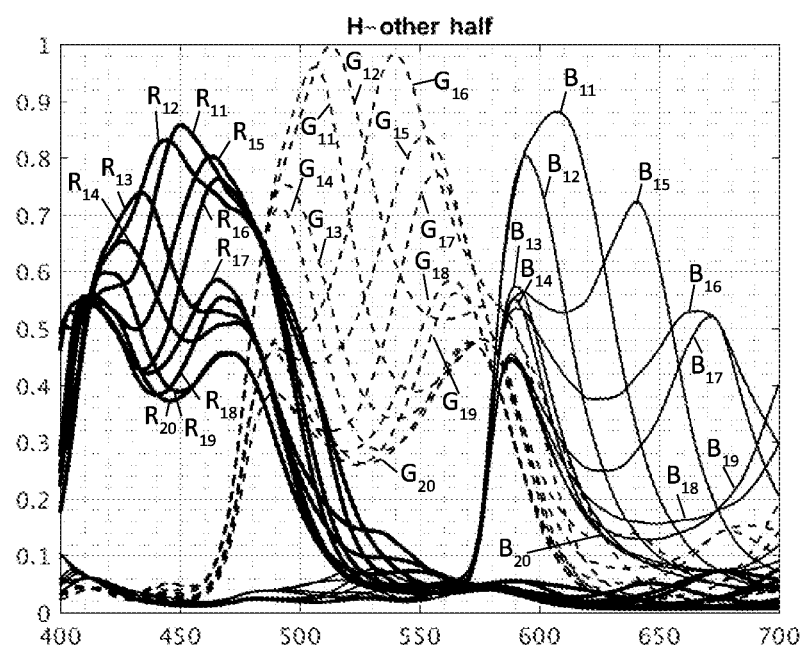
FIG. 2B shows another half of a broad-band system response obtained at different states of operation of a FP etalon based spectral imaging system disclosed herein.

FIGS. 2A and 2B show two halves of the broad-band system response obtained at different states of operation of the FP etalon and using a color image sensor (e.g. with a Bayer RGB CFA).

The Bayer RGB CFA includes red pixels, blue pixels and green pixels. A red pixel includes (or is preceded by) by a red filter, a green pixel includes (or is preceded by) a green filter, and a blue pixel includes (or is preceded by) a blue filter.

Assuming that the FB etalon has N states then a red pixel is associated with N different transfer functions that are associated with (a) the transfer function of the red filter and (b) the N different states of the FB etalon.

Assuming that the FB etalon has N states then a green pixel is associated with N different transfer functions that are associated with (a) the transfer function of the green filter and (b) the N different states of the FB etalon.

Assuming that the FB etalon has N states then a blue pixel is associated with N different transfer functions that are associated with (a) the transfer function of the blue filter and (b) the N different states of the FB etalon.

The spectral response is also represented by $\acute{H}$, see Eq. (4) below. The example illustrated in these figures shows 60 spectral bands obtained with N=20 etalon states. Each etalon state may have a different spectral response, marked as R1, R2, ... R20, G1, G2, ... G20 and B1, B2, ... and B20.

The broad-band and asymmetrical system response (spectral transmission) contrasts with the response of an ideal hyperspectral filter that provides a narrow spectrum (e.g. with FWHM<50 nm) and substantially symmetrical band spectral response.

As mentioned, the present inventors have determined that the broad-band asymmetric transmission curves of FIGS. 2A and 2B may be converted into relatively narrow-band transmission curves (referred to hereinafter as "hyperspectral transmission curves" or "hyperspectral bands") in an extended wavelength range (e.g. 400-1000 nm.

When the broad-band transmission curves are obtained with a color image sensor, then N broad-band spectral images obtained in respective N Fabri Perot etalon states of the spectral imager may be processed to provide more than N intermediate broad-band images.

A non-limiting example of an expansion process that is used to generate more than N intermediate broad-band images is the demosaicing process. This is merely a non-limiting example and other expansion processes that differ from the demosaicing process may be used to generate more than N intermediate broad-band images. The expansion process may use any extrapolation, interpolation, estimation or evaluation operations.

For simplicity of explanation the following examples will refer an expansion process that is a demosaicing process.

The demosaicing algorithm may be used to reconstruct all color channels in full resolution. The methods disclosed herein are applicable to all known CFAs. For example, for an RGB Bayer CFA, a demosaicing algorithm may be applied as follows: for each pixel of an image $\acute{I}_k$ with indices [m, n], reconstruct the red pixel, the green pixel and the blue pixels of corresponding red image, green image and blue image as a function of the neighboring pixels values (up to 2 pixels away in each direction in the acquired image).

In the following example of a demosaicing process applies different functions (fR for the red image, fG for the green image, and fB for the blue image) of sets of five by five adjacent pixels to generate the different images.

Pixels of the red image are denoted $I_{3k-2}[m, n]$.
Pixels of the green image are denoted $I_{3k-1}[m, n]$.
Pixels of the blue image are denoted $I_{3k}[m, n]$.

$$I_{3k-2}[m,n]=\acute{I}_k[m,n].\ R=f_R(\acute{I}_k[m-2:m+2,n-2:n+2])$$

$$I_{3k-1}[m,n]=\acute{I}_k[m,n].\ G=f_G(\acute{I}[m-2:m+2,n-2:n+2])$$

$$I_{3k}[m,n]=\acute{I}_k[m,n].\ B=f_B(\acute{I}[m-2:m+2,n-2:n+2]) \quad (1)$$

In this case, the total number of images triples and is equal to $\hat{N}=3N$. In general, for CFAs having more than three distinct colors, e.g. RGB-IR or RGBW CFAs, the total number of images after demosaicing is equal to $\hat{N}=cN$ This is true for CFA having any number of c distinct colors, including two or three. It should be noted that the CFA may be sensitive to two or more frequency ranges—and that the frequency ranges may be visible color frequency ranges and/or may include at least one non-visible frequency range (for example—infrared, near IR and the like.). For a monochromatic (without CFA) sensor, $I_k=\acute{I}_k$ and the total number of images N is preserved.

A "spectral cube" is obtained, including set of images defined by two spatial coordinates and a third coordinate determined by the state of the FP etalon and the color channel. The goal is to transform the spectral cube into a hyperspectral cube such that the third coordinate correlates with a wavelength of a narrow-band filter.

In the general case (e.g. monochromatic sensors or sensors with any CFA), for each state k of the FP etalon, the corresponding system signal, $\acute{I}_k$, is given by:

$$\acute{I}_k[m,n]=\acute{H}_k R+\acute{n}_k[m,n] \quad (2)$$

where R (size M×1) is the discretization of the radiosity (i.e. the influx of photons on the image sensor) of the object, $\acute{n}_k$ is the "noise" at each gap and $\acute{H}_k$ (size 1×M) is the discretization of the transmission spectrum at each gap of the etalon given by:

$$\acute{H}_{1\times M}(k)=(T)(gap_k,\lambda_1)\ldots T(gap_k,\lambda_M)) \quad (3)$$

where T ($gap_k, \lambda_1$) is the transmission of the equivalent filter at gap k, in vicinity of wavelength $\lambda_1$. Matrix $\acute{H}$, which is the total response of the system, is given by:

$$\acute{H} = \begin{pmatrix} T(gap_1,\lambda_1) & \ldots & T(gap_1,\lambda_M) \\ \vdots & \ddots & \vdots \\ T(gap_N,\lambda_1) & \ldots & T(gap_N,\lambda_M) \end{pmatrix} \quad (4)$$

In $\acute{H}_{N\times M}$, $N \geq M$, i. e. the number of etalon states is equal to or larger than the number of discrete wavelengths. It is assumed that the noise $\acute{n}$ is only a weak function of R, i.e. $\acute{n}=\acute{n}(\lambda_i)$. It should be noted that other assumptions about the noise may be used.

In the case of a color sensor, the previously described demosaicing procedure (given by eq. (1) and shall be defined henceforth by $D\{\acute{I}\}$) (or any other process that may be used to generate many broad-band images) is applied to the system signal:

$$I_{3N\times 1}=D\{\acute{I}_{N\times 1}\}=D\{\acute{H}_{N\times M}R_{M\times 1}+\acute{n}_{N\times 1}\}=H_{3N\times M}R_{M\times 1}+n_{3N\times 1} \quad (5a)$$

where $H_{3N\times M} \overset{def}{=} D\{\acute{H}_{N\times M}\}$ is the result of applying the demosaicing function to the total response function of the system, $\acute{H}$, and is now a function of both gap and color channel (e.g. of R1, R2 . . . , G1, G2, . . . , B1, B2 . . . in FIGS. 2A and 2B).

For CFAs having c>1 distinct colors:

$$I_{cN\times 1}=D\{\acute{I}_{N\times 1}\}=D\{\acute{H}_{N\times M}R_{M\times 1}+\acute{n}_{N\times 1}\}=H_{cN\times M}R_{M\times 1}+n_{cN\times 1} \quad (5b)$$

For the monochromatic sensor case, the symbol H used henceforth is simply $H_{N \times M} = \hat{H}_{N \times M}$. $H_{N \times M}$.

The object radiosity $\hat{R}$ is estimated exemplarily by a reconstruction matrix $\hat{H}_{inv}$ such that:

$$\tilde{R} = \hat{H}_{inv} I \qquad (6)$$

When reconstructing the object radiosity R, it should be remembered that for most cases the noise has a Gaussian statistical distribution, thus the maximum likelihood estimator $\tilde{R}$ for R coincides with a least square estimator which minimizes $\|I-HR\|_2^2$ over R.

According to some non-limiting examples a cost function can be used as follows:

$$\|I-HR\|_2^2 + \text{Regularization\_term}(\sigma, R) \qquad (7)$$

In which the second term is some general regularization function with σ being some tuning parameter that is potentially by itself a function of wavelength.

The regularization term could be constructed to impose some characteristics on the reconstructed signal, e.g. smoothness of the signal. It may be exemplarily derived based on the required spectral resolution and signal-to-noise ratio (SNR) per each wavelength λ.

For example, using Tikhonov's regularization method, the following cost function in which Γ is some suitably chosen Tikhonov matrix may be used for minimization:

$$\|\hat{H}_{inv} HR - R\|_2^2 + \|\Gamma R\|_2^2 \qquad (8)$$

The solution to the problem of minimizing this cost function is then given by:

$$\tilde{R} = (H^T H + \Gamma^T \Gamma)^{-1} H^T I \qquad (9)$$

and thus:

$$\hat{H}_{inv} = (H^T H + \Gamma^T \Gamma)^{-1} H^T \qquad (10)$$

Tikhonov's matrix Γ could be chosen, for example, as some multiple α of the identity matrix (Γ=αI), giving preference to solutions with smaller norms, which is known as the L2 type regularization. Alternatively, since the object radiosity R is assumed to be continuous, Γ could be constructed as some lowpass operator (e.g. a difference operator or a weighted Fourier operator) which enforces smoothness on the reconstructed $\tilde{R}$.

For any choice of Γ, the system performance may then be assessed in terms of the resulting resolution and the SNR. By assigning different weights to these parameters, an optimal Γ may be constructed.

For example, by sweeping through values of a in a certain predetermined range, it is possible to create maps of the system's resolution and SNR vs. wavelength. The system's performance at each reconstructed wavelength as a function of α is assessed by a weighted sum of these maps. The optimization is then performed by choosing, for each wavelength, a different value of $α_i$ which minimizes the weighted sum at that wavelength. In this case α is in fact a diagonal matrix $\alpha = \text{diag}(\alpha_i)$ multiplying the Tikhonov operator matrix $\tilde{\Gamma}$ such that: $\Gamma = \alpha \tilde{\Gamma}$.

According to another non-limiting example, when choosing a reconstruction matrix $\hat{H}_{inv}$, goal can be set, for example, to minimize the magnitude of the following cost function:

$$\|\tilde{R} - R\|_2 = \|\hat{H}_{inv} I - R\|_2 \leq \|\hat{H}_{inv} HR - R\|_2 + \|\hat{H}_{inv} n\|_2 \qquad (11)$$

The first term ($\|\hat{H}_{inv} HR - R\|_2$) on the right-hand side of this expression (data term) accounts for the deviations of the reconstruction. Minimizing this term is equivalent to minimizing its square, which is often more convenient to use for calculations. It is beneficial for the total system response $\hat{H}_{inv} H$ to resemble an ideal narrow-band (e.g. hyperspectral) filter, independently of the object radiosity. By using compatibility of induced norms, the following could be said about the data term in eq. (11):

$$\|R - \hat{H}_{inv} HR\|_2^2 \leq \|\text{Identity}_{M \times M} - \hat{H}_{inv} H\|_2 \|R\|_2 \qquad (12)$$

Where $\text{Identity}_{M \times M}$ is the identity matrix of size M×M.

With a possible goal of limiting noise amplification, e.g. $\|\hat{H}_{inv}\|_2^2 < \sigma$, the following cost function could be used in this exemplary method:

$$\|\text{Identity}_{M \times M} - \hat{H}_{inv} H\|_2^2 + \text{Regularization\_term}(\sigma, \hat{H}_{inv}) \qquad (13)$$

As previously, here σ is some tuning parameter, which may be constructed as a function of wavelength. This general regularization term could be constructed to impose some characteristics on the reconstructed signal, e.g., noise amplification, or smoothness of the signal. The regularization term may be exemplarily derived based on the required spectral resolution and signal-to-noise ratio (SNR) per each wavelength λ.

Since using an identity matrix poses a very strict requirement on the minimization, a general matrix $O_{M \times M}$ might be used instead and the general cost function is written as:

$$\|O_{M \times M} - \hat{H}_{inv} H\|_2^2 + \text{Regularization\_term}(\sigma, \hat{H}_{inv}) \qquad (14)$$

In this minimization problem, the FWHM of the rows of matrix O in fact represents the reconstruction spectral resolution.

As exemplified before, using Tikhonov's regularization method, the following cost function in which Γ is some suitably chosen Tikhonov matrix may be used for this minimization:

$$\|O_{M \times M}^T - H^T \hat{H}_{inv}^T\|_2^2 + \|\Gamma \hat{H}_{inv}^T\|_2^2 \qquad (15)$$

Here, the fact that an L2 norm of a matrix is equivalent to the norm of its transpose was used. The solution to the problem of minimizing this cost function is then given by:

$$\hat{H}_{inv} = O^T H [(H^T H + \Gamma^T \Gamma)^{-1}]^T \qquad (16)$$

In addition to the examples mentioned above, various regression methods may be implemented to estimate the spectral bands of the image, both linear and nonlinear.

Furthermore, various methods other than regression such as machine learning, neural network or artificial intelligence methods may be implemented to estimate the object radiosity R.

The mentioned algorithms could be tuned for any specific application requirements. It is noted that the required spectral resolution of reconstruction can be tunable—and accordingly the number of broadband images, i.e. for different applications data would be pre-processed and processed differently. For example, different optimal reconstruction matrices ($\hat{H}_{inv}$) could be used for different SNR requirements.

Figure 8A:
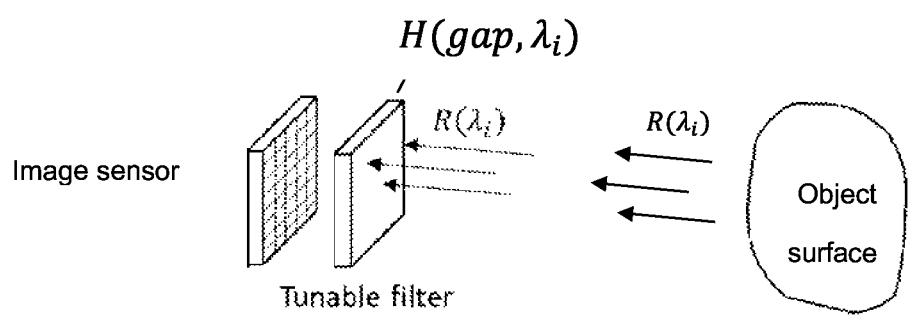
FIG. 8A illustrates an example of a system in which a tunable filter is placed between the object and the image sensor.

FIG. 8A shows an example of a system which includes a sensor and a tunable filter between an object and the image sensor. The system's signal is $\hat{I}_k[m, n] = \hat{H}_k R + \hat{n}_k[m, n]$ in which R ($\lambda_i$) is the radiosity of the object's surface which can be estimated, for example, by the methods described thus far.

The system can be enhanced, for example with a tunable light source, e.g led array or a white source with tunable filter. Such tunable light source may improve the results of the spectrum estimation, by refining the collected data and enhance the estimation.

Figure 8B:
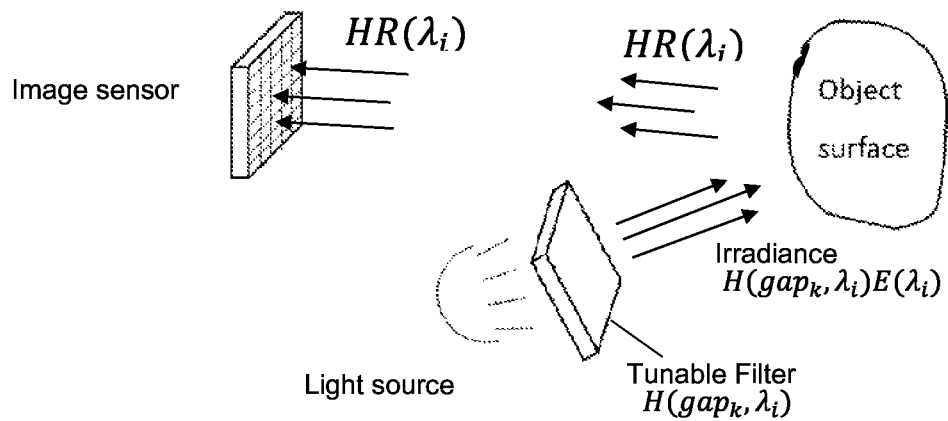
FIG. 8B illustrates an example of a system in which a tunable filter is placed in front of a light source which illuminates the object.

FIG. 8B shows an example of a system that includes a sensor and a tunable light source—without filter in front of the sensor. The tunable light source can either comprise an array of LEDs (or other types of light sources), each illuminating at a different wavelength band, or a broad-band light source with a tunable filter in front of it (as exemplified in the figure). In either case, the methods for reconstructing the object's radiosity are practically identical to the methods discussed thus far. Furthermore, this still enables to use the same methods to get narrower bands relative to the original light source bands.

Assuming that the emissivity of the surface of an object is $\varepsilon(\lambda_i)$, then the radiosity of the object's surface is $\acute{H}_k E\varepsilon$ in which $\acute{H}_k$ relates to the tunable filter's response, $E(\lambda_i)$ is the pre-filtered light source intensity, and $\acute{H}_k E$ is the irradiance on the object's surface. In case of an array of LEDs (or other types of light sources) it is still possible to write irradiance on the object's surface as $\acute{H}_k E$. Following the exemplary methods described thus far, the object's spectral response can be estimated from the system's signal $\acute{I}_k[m, n] = \acute{H}_k R + \acute{n}_k[m, n]$ in which R is defined as $R = E\varepsilon$.

Figure 8C:
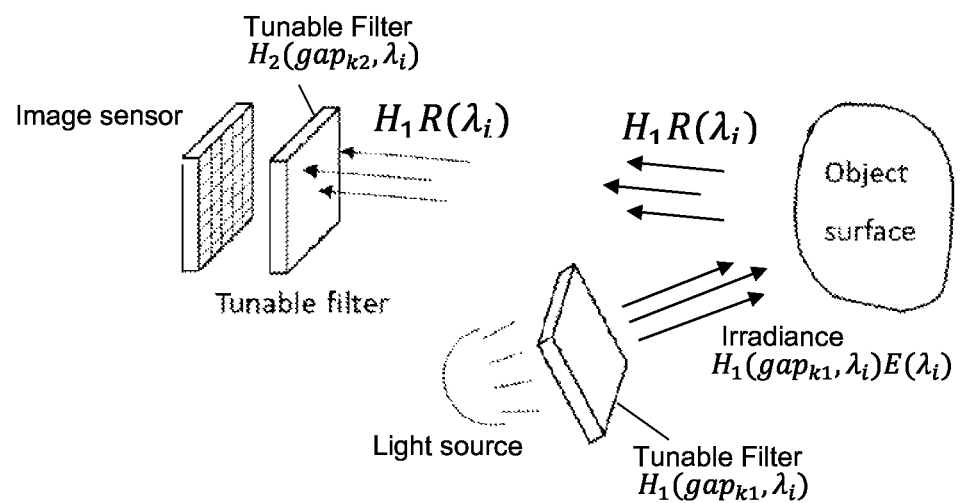
FIG. 8C illustrates an example of a system in which a first tunable filter is placed in front of a light source which illuminates the object and a second tunable filter is placed between the object and the image sensor.

FIG. 8C shows another example of a system which is a combination of the examples in FIGS. 8A-B and includes a tunable light source (as described above) with an additional tunable filter in front of the image sensor. In this example, $R = E\varepsilon$ and the total response of the filters is $\acute{H}_k = \acute{H}_{2,k2} \acute{H}_{1,k1}$ in which $\acute{H}_{1,k1}$ is the response of the filter in front of the light source set at gap $k_1$ and $\acute{H}_{2,k2}$ is the response of the filter in front of the image sensor set at gap $k_2$.

In this case, it is possible to obtain narrow band images solely by alternating the filter and the light source spectra. In this method, the light that reaches the sensor will include only the common wavelengths transmittable by both filters at their set gaps.

Figure 3:
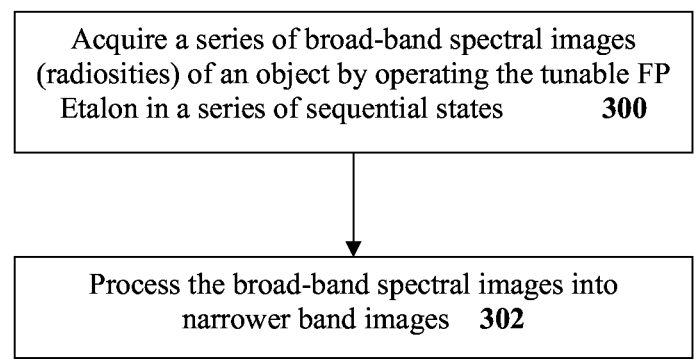
FIG. 3 shows schematically in a flow chart two general steps of a method disclosed herein.

In a more concise manner, FIG. 3 shows schematically in a flow chart the two general steps of a method disclosed herein: in step 300, a series of broad-band spectral images of an object is acquired by operating the tunable FP etalon in a series of sequential states. In step 302, the broad-band spectral images are processed into narrower band images.

Step 302 may be followed by a step of—using the narrow band images e.g. displaying one or more of the images (for example—one image at a time) on a computer display device, storing one or more of the images, transmitting one or more of the images, and the like—or some other usage.

Figure 4A:
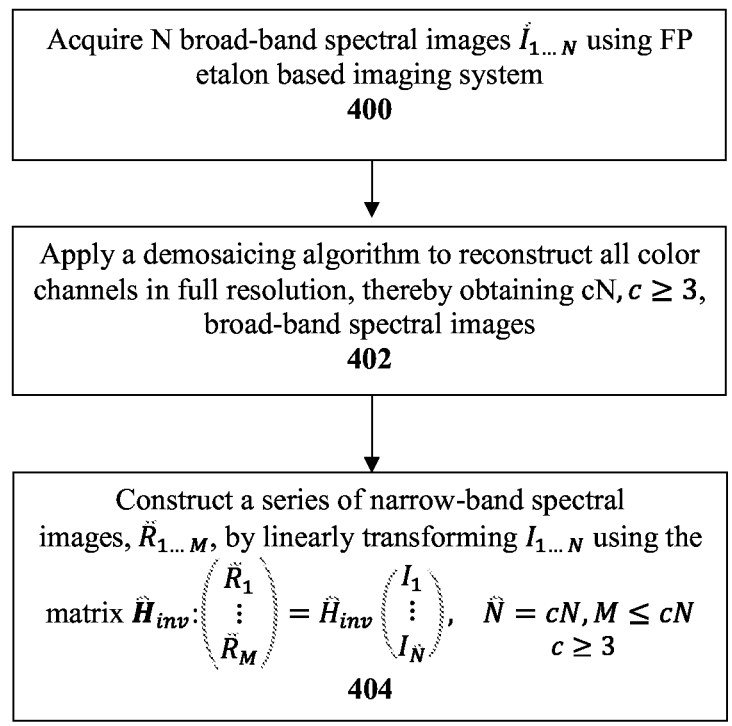
FIG. 4A shows schematically in a flow chart more details of a method disclosed herein, for a FP etalon based spectral imager with a color image sensor.

FIG. 4A shows schematically in a flow chart more details of a method.

In step 400, N broad-band spectral images $\acute{I}_{1 \ldots N}$ are acquired. In step 402, a demosaicing algorithm is applied on the N broad-band spectral images to reconstruct all color channels in full resolution, thereby obtaining cN broad-band spectral images (e.g. 3N when C=3 for a Bayer CFA) or 4N broad-band spectral images (where C=4 when using RGB-IR or RGBW CFAs).

In step 404, a series of narrow-band spectral images, $\tilde{R}_{1 \ldots M}$, is constructed by linearly transforming $I_{1 \ldots \tilde{N}}$ using the matrix $$\hat{H}_{inv} : \begin{pmatrix} \tilde{R}_1 \\ \vdots \\ \tilde{R}_M \end{pmatrix} = \hat{H}_{inv} \begin{pmatrix} I_1 \\ \vdots \\ I_{\tilde{N}} \end{pmatrix}, \hat{N} = cN, M \leq cN.$$

Figure 4B:
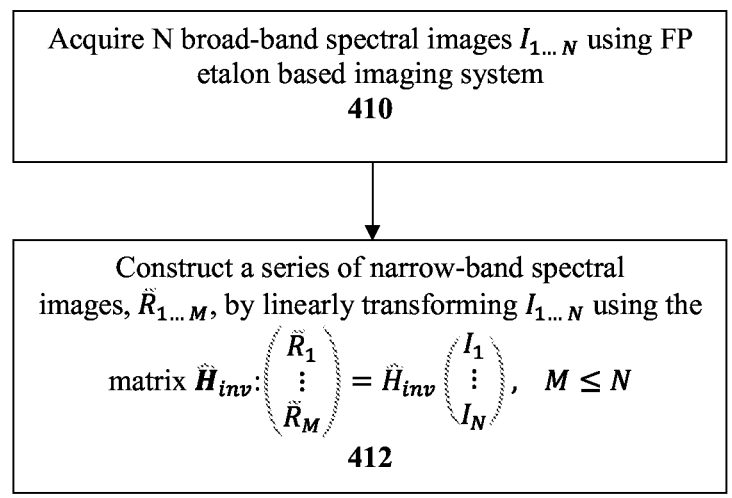
FIG. 4B shows schematically in a flow chart more details of a method disclosed herein, for a FP etalon based spectral imager with a monochromatic image sensor.

FIG. 4B shows schematically in a flow chart more details of a method according to an example disclosed herein, for a FP etalon based spectral imager with a monochromatic image sensor. In step 410, N broad-band spectral images $I_{1 \ldots N}$ are acquired. In step 412, a series of narrow-band spectral images, $\tilde{R}_{1 \ldots M}$, is constructed by linearly transforming $I_{1 \ldots N}$ using the matrix $$\hat{H}_{inv} : \begin{pmatrix} \tilde{R}_1 \\ \vdots \\ \tilde{R}_M \end{pmatrix} = \hat{H}_{inv} \begin{pmatrix} I_1 \\ \vdots \\ I_N \end{pmatrix}, M \leq N.$$

Figure 5A:
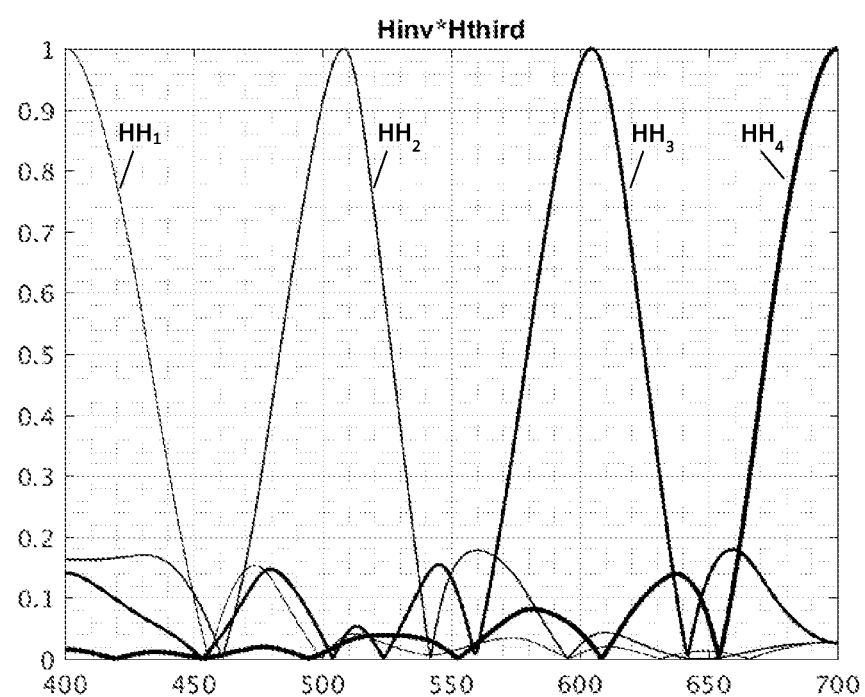
FIG. 5A shows one third of a total system response obtained after applying a method disclosed herein to the broad-band system response of FIGS. 2A and 2B.
Figure 5B:
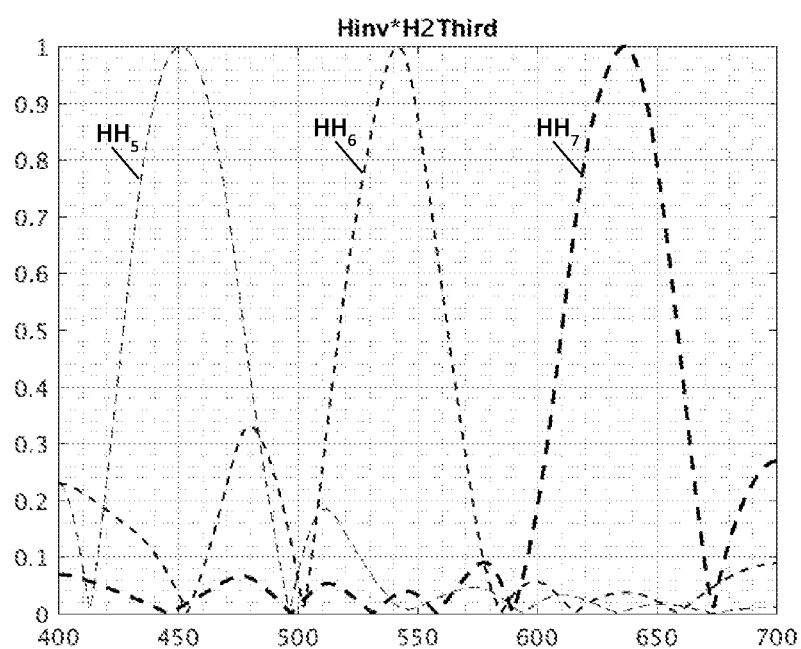
FIG. 5B shows another third of a total system response obtained after applying a method disclosed herein to the broad-band system response of FIGS. 2A and 2B.
Figure 5C:
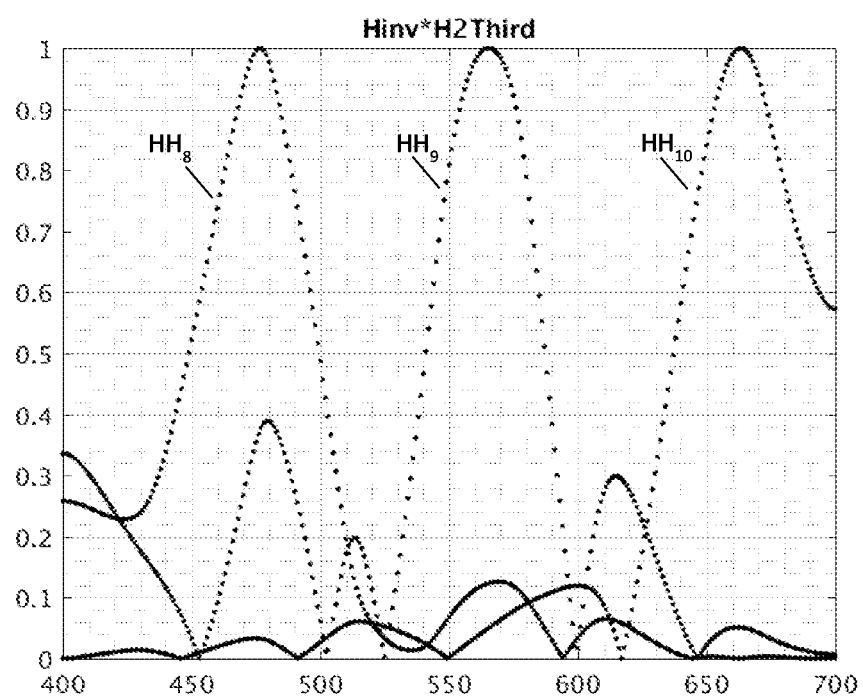
FIG. 5C shows yet another third of a total system response obtained after applying a method disclosed herein to the broad-band system response of FIGS. 2A and 2B.

FIGS. 5A-5C show a "modified" total system response $\hat{H}_{inv} H$ in three separate graphs. The "modified" term refers to the fact that the total system response is changed from the response shown in FIGS. 2A and 2B as a result of the processing applied in the methods described above. Each graph provides a number of narrow band HHi curves (spectra).

In summary, the present inventors have managed to perform narrow-band spectral imaging and even hyperspectral imaging using a FP etalon-based spectral imager that was not known to be able to provide such spectral or hyperspectral imaging.

FIG. 6 illustrates an example of a method 600, according to the presently disclosed subject matter. Some operations described below with reference to FIG. 6 (as well as FIG. 7 and FIGS. 3, 4a and 4b described above) can be performed by a processing circuitry configured for this purpose. As mentioned above such processing circuitry can be part of system 100 (e.g. as part of control unit 106 and/or etalon 108) or according to other examples be part of a computerized device externally connectable to system 100.

Method 600 may involve generating narrow-band spectral images.

Method 600 may include steps 610 and 620.

Step 610 may include acquiring, by a spectral imager that comprises a tunable filter, a first plurality (N) of broad-band spectral images associated with respective states of the tunable filter. N is an integer that exceeds one. The tunable filter may be a Fabri-Perot tunable filter such as a MEMS Fabri-Perot etalon (as shown above by way of example with reference to FIG. 1). The respective states of the tunable filter may include N different states. The respective states differ from each other by their transfer function.

Step 610 may be followed by step 620 of processing, by a processing circuitry (such as a hardware processor)), the first plurality of broad-band spectral images into a second plurality (M) of narrow-band spectral images. M is an integer that exceeds one. The processing may include executing instructions and/or code by the processing circuitry.

The processing circuitry may be a central processing unit, a graphic processor, a hardware accelerator, an FPGA, an ASIC, and the like.

The spectral imager may include an image sensor that may be a monochromatic sensor or a color filter that has a third plurality (C) of filter types. filters of different types differ from each other by transfer function. C is an integer than exceeds two.

The image sensor may include any combination of any number of filter types—for example—(a) red, green and blue, (b) red, green, blue and white, (c) red, green, blue and infrared, (d) red, blue and white, and the like.

Step 620 may include step 622 of applying an expansion process for generating, from the first plurality of broad-band spectral images, a fourth plurality (Q) of broad-band spectral images. Q is a positive integer. Q exceeds N. Q exceeds M. The ratio between Q and N may be an integer or not.

The expansion process increases the amount of information. The expansion process may be a demosaicing process but may differ from a demosaicing process.

Step 622 may be followed by step 624 of processing the fourth plurality of broad-band spectral images into the second plurality of the narrow-band spectral images.

Step 624 may include constructing the second plurality of narrow-band spectral images by linearly transforming the fourth plurality of broad-band spectral images using a reconstruction matrix.

Examples of calculations that are executed during step 624 are illustrated in the pages above—especially equations (1)-(10) and the associated text.

Step 624 may include constructing the second plurality of narrow-band spectral images by using a reconstruction matrix; wherein the reconstruction matrix represents a cost function and spectral responses associated with respective states of the tunable filter. The reconstruction matrix may be calculated based on a Tikhonov matrix. The Tikhonov matrix may be a multiple (alpha) of the identity matrix.

The Tikhonov matrix may be selected out of a group of Tikhonov matrices. See, for example, the selection of alpha.

The group of Tikhonov matrices may be associated with a group of reconstruction matrices. Different reconstruction matrices of the group may be associated with different values of one or more spectral imager performance attributes. The one or more spectral imager performance attributes may be signal to noise ratio and/or resolution.

Step 624 may include calculating the reconstruction matrix.

Step 624 may include selecting the Tikhonov matrix out of a group of Tikhonov matrices.

According to one example, the calculation or selection of the reconstruction matrices (e.g. Tikhonov matrices) may be executed before generating the fourth plurality of broad-band spectral images. According to another example, the calculation or selection may be executed after generating the fourth plurality of broad-band images but before processing the fourth plurality of broad-band spectral images into the second plurality of the narrow-band spectral images. According to yet another example, the calculation or selection may be executed during the processing of the fourth plurality of broad-band spectral images into the second plurality of the narrow-band spectral images.

The selection may be based on at least one property of at least one of the first plurality of broad-band spectral images.

Accordingly—after one or more broad-band spectral images are acquired during step 610—the method may evaluate one or more property and then decide which Tikhonov matrix to select. For example—assuming that a first broad-band spectral image is acquired and has a low signal to noise ratio then a Tikhonov matrix that is associated with low signal to noise ratio should be selected. In this example there may be a need to increase the signal to noise ratio of one or more narrow-band spectral images generated during step 620—and more emphasis may be assigned to the signal to noise ratio.

FIG. 7 illustrates an example of method 700.

Method 700 may involve generating narrow-band spectral images.

Method 700 may include steps 610 and 621.

Step 610 may include acquiring, by a spectral imager that comprises a tunable filter, a first plurality (N) of broad-band spectral images associated with respective states of the tunable filter. N is an integer that exceeds one. The tunable filter may be a Fabri-Perot tunable filter such as a MEMS Fabri-Perot etalon. The respective states of the tunable filter may include N different states. The respective states differ from each other by their transfer function.

Step 610 may be followed by step 621 of processing, by a processing circuitry, the first plurality of broad-band spectral images into a second plurality (M) of narrow-band spectral images. M is an integer that exceeds one.

Step 621 differs from step 620 by including step 626 instead of steps 622 and 624. Notably, step 621 does not include performing the expansion process.

Step 626 may include constructing the second plurality of narrow-band spectral images by linearly transforming the first plurality of broad-band spectral images using a reconstruction matrix.

Step 626 may include constructing the second plurality of narrow-band spectral images by using a reconstruction matrix; wherein the reconstruction matrix represents a cost function and spectral responses associated with respective states of the tunable filter. The reconstruction matrix may be calculated based on a Tikhonov matrix. The Tikhonov matrix may be a multiple (alpha) of the identity matrix.

The Tikhonov matrix may be selected out of a group of Tikhonov matrices. See, for example, the selection of alpha described above.

The group of Tikhonov matrices may be associated with a group of reconstruction matrices. Different reconstructions matrices of the group may be associated with different values of one or more spectral imager performance attributes. The one or more spectral imager performance attributes may be signal to noise ratio and/or resolution.

Step 626 may include calculating the reconstruction matrix.

Step 626 may include selecting the Tikhonov matrix out of a group of Tikhonov matrices.

The selecting may be executed during the processing of the first plurality of broad-band spectral images into the second plurality of the narrow-band spectral images.

The selection may be based on at least one property of at least one of the first plurality of broad-band spectral images.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

For example, any digital computer system can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well known to those skilled in the art and thus are not further described herein. The methods and/or processes disclosed herein may be implemented as a computer program product such as, for example, a computer program tangibly embodied in an information carrier, for example, in a non-transitory computer-readable or non-transitory machine-readable storage device and/or in a propagated signal, for execution by or to control the operation of, a data processing apparatus including, for example, one or more programmable processors and/or one or more computers. The term "non-transitory" is used to exclude transitory, propagating signals, but to otherwise include any volatile or non-volatile computer memory technology suitable to the application including, for example, distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by a communication network.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

All patents and patent applications mentioned in this application are hereby incorporated by reference in their entirety for all purposes set forth herein. It is emphasized that citation or identification of any reference in this application shall not be construed as an admission that such a reference is available or admitted as prior art.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the spectral imager and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of spectral imager that is illustrated in any of the figures and/or specification and/or the claims may be provided.

Any combination of any spectral imager illustrated in any of the figures and/or specification and/or the claims may be provided.

Any combination of any set of spectral imagers illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A method of generating narrow-band spectral images, the method comprising:
    acquiring, by a spectral imager that comprises a tunable filter, a first plurality (N) of broad-band spectral images, each is acquired while the tunable filter is at a different state; and
    processing, by a hardware processor, the first plurality of broad-band spectral images, the processing comprising:
    applying a reconstruction matrix that represents a cost function and spectral responses associated with different states of the tunable filter on the plurality of broad-band spectral images to thereby construct a second plurality (M) of narrow-band spectral images and improve spectral resolution of the spectral images.

2. The method according to claim 1, wherein each broad-band image of the first plurality of broad-band spectral images is associated with a respective broad-band transmission curve having a respective broad-band full width half maximum value; and wherein each narrow-band spectral image of the second plurality of narrow-band spectral images is associated with a respective narrow-band transmission curve having a narrow-band full width half maximum smaller than the broad-band full width half maximum value of the broad-band transmission curve.

3. The method of claim 2, wherein the spectral imager includes an image sensor having a filter array with a third plurality (C) of filter types, wherein filters of different types differ from each other by transfer function; and wherein C exceeds two.

4. The method of claim 3, wherein C equals three and the filter array is any one of:
    a color filter array; a red, green, and blue color filter array; and a red, blue and white filter array.

5. The method of claim 3, wherein C equals four and the filter array is any one of:
    a red, green, blue, and infrared filter array; and a red, green, blue and white filter array.

6. The method of claim 3, wherein the method comprises applying an expansion process for generating, from the first plurality of broad-band spectral images, a fourth plurality (Q) of broad-band spectral images and processing the fourth plurality of broad-band spectral images into the second plurality of the narrow-band spectral images; and wherein Q exceeds each one of N and M.

7. The method according to claim 6, wherein a ratio between Q and N is an integer.

8. The method according to claim 6, wherein the expansion process is a demosaicing process.

9. The method of claim 6, wherein the processing of the fourth plurality of broad-band spectral images into the second plurality of narrow-band spectral images comprises constructing the second plurality of narrow-band spectral images by linearly transforming the fourth plurality of broad-band spectral images using a reconstruction matrix.

10. The method according to claim 1, wherein the reconstruction matrix is calculated based on a Tikhonov matrix.

11. The method according to claim 10, wherein the Tikhonov matrix is a multiple of the identity matrix.

12. The method according to claim 10, wherein the Tikhonov matrix is a lowpass operator.

13. The method according to claim 10, wherein the Tikhonov matrix is selected out of a group of Tikhonov matrixes, the group of Tikhonov matrixes are associated with a group of reconstruction matrixes; wherein different reconstructions matrixes of the group are associated with different values of one or more spectral imager performance attributes and wherein the one or more spectral imager performance attributes comprises any one of: signal to noise ratio; resolution.

14. The method according to claim 1, wherein the reconstruction matrix equals:
$(H^T H + V^T V y^1 H^T)$, wherein H is a matrix that represents spectral responses associated with respective states of the tunable filter, and T a Tikhonov matrix.

15. The method according to claim 10, comprising selecting the Tikhonov matrix out of a group of Tikhonov matrixes based on at least one property of at least one of the first plurality of broad-band spectral images, wherein the at least one property is selected from: signal to noise ratio; and resolution.

16. The method according to claim 1, wherein the first plurality (N) of broad-band spectral images is acquired by a monochromatic image sensor.

17. The method according to claim 1, wherein the tunable filter is a Fabri Perot etalon and wherein each state of the tunable filter correspond to a different gap between reflective surfaces of the tunable filter.

18. The method according to claim 1, wherein a transmission curve of each state partially overlaps the transmission curves of neighboring states.

19. A spectral imager that comprises a tunable filter and an image sensor;
wherein the sensor is configured to acquire a first plurality (N) of broad-band spectral images, each is acquired while the tunable filter is at a different state; and
the imager further comprise a processor configured to process the first plurality of broad-band spectral images, the processing comprising:
applying a reconstruction matrix that represents a cost function and spectral responses associated with different states of the tunable filter on the plurality of broad-band spectral images to thereby construct a second plurality (M) of narrow-band spectral images and improve spectral resolution of images provided by the imager.

20. The spectral imager according to claim 19, wherein each broad-band image of the first plurality of broad-band spectral images is associated with a respective broad-band transmission curve having a respective broad-band full width half maximum value; and wherein each narrow-band spectral image of the second plurality of narrow-band spectral images is associated with a respective narrow-band transmission curve having a narrow-band full width half maximum smaller than the broad-band full width half maximum value of the broad-band transmission curve.

21. The spectral imager according to claim 19, wherein the image sensor includes a filter array with a third plurality (C) of filter types, wherein filters of different types differ from each other by transfer function; and wherein C exceeds two.

22. The spectral imager according to claim 21, wherein C equals three and the filter array is any one of: a color filter array; a red, green, and blue color filter array; and a red, blue, and white filter array.

23. The spectral imager according to claim 21, wherein C equals four and the filter array is any one of: red, green, blue, and infrared filter array and a red, green, blue, and white filter array.

24. The spectral imager according to claim 21, wherein the processor is configured to apply an expansion process for generating, from the first plurality of broad-band spectral images, a fourth plurality (Q) of broad-band spectral images and process the fourth plurality of broad-band spectral images into the second plurality of the narrow-band spectral images; and wherein Q exceeds each one of N and M.

25. The spectral imager according to claim 24, wherein a ratio between Q and N is an integer.

26. The spectral imager according to claim 24, wherein the processor is configured to construct the second plurality of narrow-band spectral images by linearly transforming the fourth plurality of broad-band spectral images using a reconstruction matrix.

27. The spectral imager according to claim 19, wherein the reconstruction matrix is calculated based on a Tikhonov matrix.

28. The spectral imager according to claim 19, wherein the image sensor is a monochromatic image sensor.

29. The spectral imager according to claim 19, wherein the tunable filter is a Fabri Perot etalon, and wherein each state of the tunable filter corresponds to a different gap between reflective surfaces of the tunable filter.

30. The spectral imager according to claim 19, wherein a transmission curve of each state partially overlaps the transmission curves of neighboring states.

31. A non-transitory computer readable storage medium tangibly embodying a program of instructions that, when executed by a computer, causing the computer to perform a method of generating narrow-band spectral images, the method comprising:
acquiring, by a spectral imager that comprises a tunable filter, a first plurality (N) of broad-band spectral images, each is acquired while the tunable filter is at a different state; and
processing, by a hardware processor, the first plurality of broad-band spectral images, the processing comprising:
applying a reconstruction matrix that represents a cost function and spectral responses associated with different states of the tunable filter on the plurality of broad-band spectral images to thereby construct a second plurality (M) of narrow-band spectral images and improve spectral resolution of the spectral images.

32. The non-transitory computer readable storage medium according to claim 31, wherein a transmission curve of each state partially overlaps the transmission curves of neighboring states.

* * * * *